(12) United States Patent
McLaughlin et al.

(10) Patent No.: US 7,122,290 B2
(45) Date of Patent: Oct. 17, 2006

(54) HOLOGRAPHIC STORAGE MEDIUM

(75) Inventors: Michael Jeffrey McLaughlin, Albany, NY (US); Marc Dubois, Clifton Park, NY (US); James Edward Pickett, Schenectady, NY (US); Peifang Tian, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/869,243

(22) Filed: Jun. 15, 2004

(65) Prior Publication Data

US 2005/0277747 A1    Dec. 15, 2005

(51) Int. Cl.
*G11B 7/245*    (2006.01)

(52) U.S. Cl. ............... 430/270.1; 430/270.2; 430/280.1; 525/478; 525/479; 522/64; 522/65; 522/66; 522/67; 522/170; 522/172

(58) Field of Classification Search .................... None
See application file for complete search history.

(56) References Cited

U.S. PATENT DOCUMENTS

| | | |
|---|---|---|
| 4,920,220 A | 4/1990 | Phaff |
| 5,037,861 A | 8/1991 | Crivello et al. |
| 5,169,862 A | 12/1992 | Crivello et al. |
| 5,260,399 A | 11/1993 | Crivello et al. |
| 5,260,999 A | 11/1993 | Wyman |
| 5,387,698 A | 2/1995 | Crivello et al. |
| 5,438,439 A | 8/1995 | Mok et al. |
| 5,440,669 A | 8/1995 | Rakuljic |
| 5,442,026 A | 8/1995 | Crivello et al. |
| 5,450,218 A | 9/1995 | Heanue et al. |
| 5,523,374 A | 6/1996 | Bard et al. |
| 5,583,194 A | 12/1996 | Crivello et al. |
| 5,759,721 A | 6/1998 | Dhal et al. |
| 6,124,076 A | 9/2000 | Dhar et al. |
| 6,197,842 B1 * | 3/2001 | Marchin et al. ............... 522/35 |
| 6,221,536 B1 | 4/2001 | Dhar et al. |
| 6,268,089 B1 * | 7/2001 | Chandross et al. ............ 430/1 |
| 6,482,551 B1 | 11/2002 | Dhar et al. |
| 6,627,354 B1 | 9/2003 | Chandross et al. |
| 6,650,447 B1 | 11/2003 | Curtis et al. |
| 6,743,552 B1 | 6/2004 | Setthachayanon et al. |
| 6,784,300 B1 | 8/2004 | Cetin et al. |
| 2002/0068223 A1 * | 6/2002 | Cetin et al. .................... 430/1 |
| 2003/0044691 A1 | 3/2003 | Setthachayanon et al. |
| 2003/0087163 A1 | 5/2003 | Otaki et al. |
| 2003/0199603 A1 | 10/2003 | Walker et al. |
| 2003/0206320 A1 | 11/2003 | Cole et al. |
| 2003/0224250 A1 | 12/2003 | Setthachayanon et al. |
| 2004/0197670 A1 * | 10/2004 | Takeyama ...................... 430/1 |

FOREIGN PATENT DOCUMENTS

| | | |
|---|---|---|
| EP | 1 550 677 | 7/2005 |
| WO | WO 99/26112 | 5/1999 |
| WO | WO 02/19040 A2 | 3/2002 |
| WO | WO 2004/011522 | 2/2004 |

OTHER PUBLICATIONS

PCT International Search Report dated Sep. 29, 2005.
Suzuki et al., "Holographic Recording in TiO2 Nanoparticle-Dispersed Methacrylate Photopolymer Films", Applied Physics Letters, vol. 81, pp. 4121-4123 (2002).

* cited by examiner

*Primary Examiner*—Marc S. Zimmer
(74) *Attorney, Agent, or Firm*—Shawn A. McClintic; William E. Powell, III

(57) ABSTRACT

Holographic storage mediums, methods for producing the storage medium, methods for storing data in the holographic storage medium, and optical storage reading methods are described herein. The holographic storage medium can be formed from a composition comprising a thermally crosslinked polysiloxane binder; a photoactive material; and a photo-initiator, wherein the photoactive material has a concentration that remains about the same before and after a thermal cure process to form the thermally crosslinked polysiloxane binder.

11 Claims, 3 Drawing Sheets

(a)    (b)

(a)  (b)

HOLOGRAPHIC STORAGE MEDIUM

BACKGROUND

The present disclosure relates to optical data storage media, and more particularly, to holographic storage mediums as well as methods of making and using the same.

Holographic storage is data storage of holograms, which are images of three dimensional interference patterns created by the intersection of two beams of light, in a photosensitive medium. The superposition of a reference beam and a signal beam, containing digitally encoded data, forms an interference pattern within the volume of the medium resulting in a chemical reaction that changes or modulates the refractive index of the medium. This modulation serves to record as the hologram both the intensity and phase information from the signal. The hologram can later be retrieved by exposing the storage medium to the reference beam alone, which interacts with the stored holographic data to generate a reconstructed signal beam proportional to the initial signal beam used to store the holographic image.

Each hologram may contain anywhere from one to $1 \times 10^6$ or more bits of data. One distinct advantage of holographic storage over surface-based storage formats, including CDs or DVDs, is that a large number of holograms may be stored in an overlapping manner in the same volume of the photosensitive medium using a multiplexing technique, such as by varying the signal and/or reference beam angle, wavelength, or medium position. However, a major impediment towards the realization of holographic storage as a viable technique has been the development of a reliable and economically feasible storage medium.

Early holographic storage media employed inorganic photorefractive crystals, such as doped or undoped lithium niobate ($LiNbO_3$), in which incident light creates refractive index changes. These index changes are due to the photo-induced creation and subsequent trapping of electrons leading to an induced internal electric field that ultimately modifies the index through a linear electro-optic effect. However, $LiNbO_3$ is expensive, exhibits relatively poor efficiency, and requires thick crystals to observe any significant index changes.

More recent work has led to the development of polymers that can sustain larger refractive index changes owing to optically induced polymerization processes. These materials, which are referred to as photopolymers, have significantly improved optical sensitivity and efficiency relative to $LiNbO_3$ and its variants. In prior art processes, "single-chemistry" systems have been employed, wherein the media comprise a homogeneous mixture of at least one photoactive polymerizable liquid monomer or oligomer, an initiator, an inert polymeric filler, and optionally a sensitizer. Since it initially has a large fraction of the mixture in monomeric or oligomeric form, the medium may have a gel-like consistency that necessitates an ultraviolet (UV) curing step to provide form and stability. Unfortunately, the UV curing step may consume a large portion of the photoactive monomer or oligomer, leaving significantly less photoactive monomer or oligomer available for data storage. Furthermore, even under highly controlled curing conditions, the UV curing step may often result in variable degrees of polymerization and, consequently, poor uniformity among media samples.

Other prior examples of holographic recording media are based on "two-chemistry" systems, wherein a binder or material that provides the medium with form and stability, is different from the photoactive component. These systems comprise a mixture of at least one photoactive polymerizable liquid monomer or oligomer, an initiator, at least one precursor (i.e., monomers or oligomers) to the binder polymer, and optionally a sensitizer. These mixtures also initially have a gel-like consistency until the precursors to the binder polymer are partially cured to provide form and stability to the medium. Problems similar to those described for single-chemistry systems may occur during the UV binder cure step. The medium, prior to data storage, has a uniform refractive index based on the weight fraction of each component and their individual refractive indices. Polymerization of the photoactive monomers (or oligomers) leads to the formation of a polymer that has a refractive index different from that of the binder. Photoactive monomer molecules diffuse into the region of polymerization, while binder material diffuses out because it does not participate in the polymerization. Spatial separation of the photopolymer, formed from the monomer, and the binder provides the refractive index modulation required to form a hologram. While better results are obtained using these two-chemistry systems, the possibility exists for reaction between the precursors to the binder polymer and the photoactive monomer. Such reaction would reduce the refractive index contrast between the binder and the polymerized photoactive monomer, thereby affecting any stored holograms. Furthermore, two-chemistry systems may also be plagued by changes in dimension owing to shrinkage induced by polymerization of the photoactive monomers during data recording.

Thus, there remains a need for improved polymer systems suitable for holographic data storage media. It would be advantageous if the binder curing step, which provides stability and form to the media, did not reduce the amount of photoactive material available for data storage. It would be further advantageous if the curing step resulted in consistent levels of binder polymerization between media samples, the possibility for reaction between the binder and the photoactive material were diminished, and dimensional changes during data recording were eliminated.

BRIEF SUMMARY

Disclosed herein are holographic storage mediums, methods for producing the storage medium, methods for storing data in the holographic storage medium, and methods for optical storage reading. In one embodiment, the holographic storage medium formed from a composition comprises a thermally crosslinked polysiloxane binder; a photoactive material; and a photo-initiator, wherein the photoactive material has a concentration that remains about the same before and after a thermal cure process to form the thermally crosslinked polysiloxane binder.

A method for producing a holographic storage medium comprises forming a mixture comprising a thermally polymerizable siloxane binder material, a photoactive material, and a photo-initiator; heating the mixture effective to cure the thermally polymerizable siloxane binder material, wherein the photoactive material has a concentration that remains about the same before and after heating the mixture; and writing data into the medium with an information-carrying light pattern at a wavelength effective to activate the photo-initiator and to polymerize at least a portion of the photoactive material.

A method for storing data in a holographic storage medium comprises forming a holographic storage medium comprising a thermally cured polysiloxane binder, a photoactive material, and a photo-initiator, wherein the photoactive material has a concentration that remains about the same before and after a thermal cure process to form the thermally crosslinked polysiloxane binder; and illuminating the holographic storage medium with both a signal beam containing data and a reference beam, thereby forming within the holographic storage medium an interference pattern, wherein the photo-initiator initiates polymerization of at least a portion of the photoactive material in response to the signal beam and reference beam.

An optical reading method comprises forming a holographic storage medium comprising a thermally cured polysiloxane binder, a photoactive material, and a photo-initiator, wherein the photoactive material has a concentration that remains about the same before and after a thermal cure process to form the thermally crosslinked polysiloxane binder; illuminating the holographic storage medium with both a signal beam containing data and a reference beam, thereby forming within the holographic storage medium an interference pattern, wherein the photo-initiator initiates polymerization of at least a portion of the photoactive material, resulting in formation of a hologram in the holographic storage medium; and illuminating the holographic storage media with a read beam effective to read the data contained by diffracted light from the hologram.

The above described and other features are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

Figure 1:
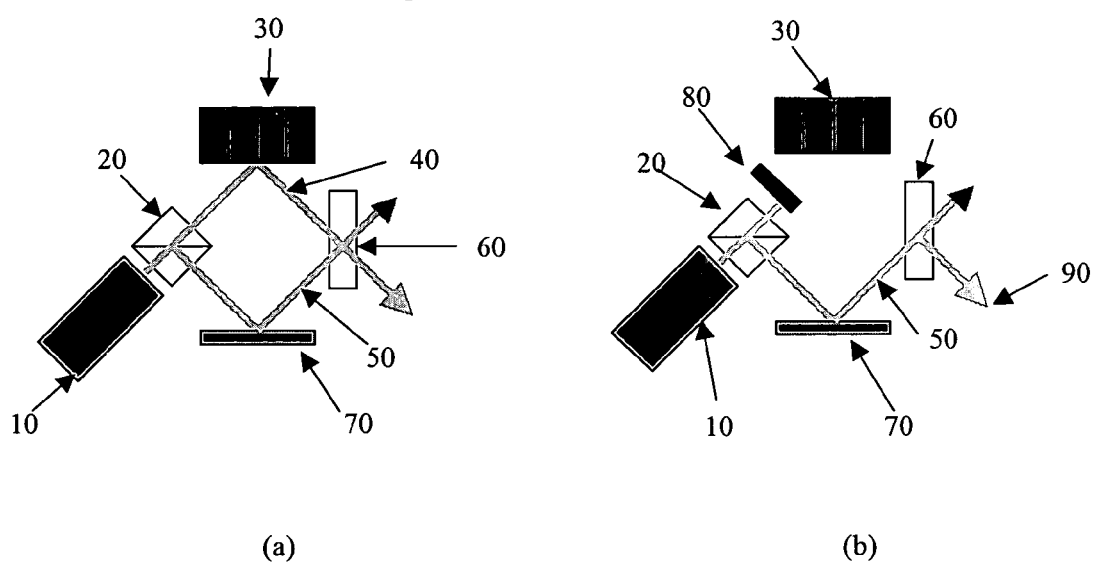
FIG. 1 is a schematic representation of a holographic storage setup for (a) writing data and (b) reading stored data.

Disclosed herein are optical data storage media for use in holographic data storage and retrieval. Also disclosed are methods directed to holographic storage media preparation, data storage, and data retrieval. In contrast to the prior art, the holographic storage media and methods disclosed herein are based on a two-chemistry system generally comprising a binder material and a photoactive material, wherein the binder material is thermally crosslinked. Advantageously, by thermally crosslinking the binder material, more efficient crosslinking of the binder is obtained relative top prior art UV curing processes. Because of this, polymerization of the binder material can more easily be controlled by thermal curing, resulting in consistent levels of polymerization between media samples. Moreover, by employing two separate chemical processes (i.e., thermal crosslinking to cure the binder, and photoactivation of the photoactive material), the photoactive material is preserved for data storage instead of being consumed during media formation (i.e., binder cure). Moreover, polymerization of the binder material can more easily be controlled by the thermal curing process resulting in consistent and reproducible levels of polymerization between media samples. Consequently, with controllable, predictable rigidity to the binder and photoactive material concentration, the media disclosed herein offers significant advantageous over the prior art. For example, modulation is significantly improved relative to the prior art UV curing processes.

In one embodiment, the holographic storage medium, prior to data storage and after a thermal curing step, comprises a thermally cured polysiloxane binder, a photoactive material, and the photo-initiator. The thermally cured polysiloxane binder is formed from silicone monomers and/or oligomers having alkenyl and hydride functionalities. Alternatively, the holographic storage medium, prior to data storage and after the thermal curing step, may optionally comprise a sensitizer and/or a binder catalyst. After the thermal curing step, the thermally polymerizable siloxane binder material is crosslinked and/or none, or essentially none, of photoactive material is crosslinked, i.e., a concentration of photoactive material is essentially unchanged before and after the thermal curing step. In this manner, greater modulation can be obtained compared to a UV curing the binder material.

In one embodiment, all, or essentially all, of the thermally polymerizable siloxane binder material is crosslinked during the thermal curing step. To produce a suitably thermally cured binder, the hydride to alkenyl ratio is conveniently taken in the range of 0.5 to 3, preferably in the ratio of 0.5 to 2, and most preferably in the range of 1.0 to 1.75.

In one embodiment, the silicone monomers and/or oligomers having the alkenyl functionalities that may be employed to form the binder are alkenyl siloxanes of the general formula (I):

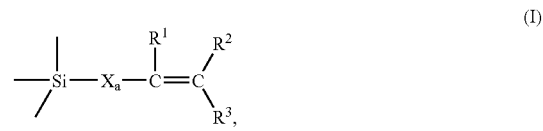

wherein $R^1$, $R^2$, and $R^3$ each independently comprise hydrogen or a monovalent hydrocarbon radical, X a divalent hydrocarbon radical and a is a whole number having a value between 0 and 8, inclusive. The terms "monovalent hydrocarbon radical" and "divalent hydrocarbon radical" as used herein are intended to designate straight chain alkyl, branched alkyl, aralkyl, cycloalkyl, and bicycloalkyl radicals.

The silicone hydride monomers and/or oligomers are hydrosiloxanes having hydrogen directly bonded to one or more of the silicon atoms, and therefore contain at least one reactive Si—H functional group.

In the storage medium, prior to data storage and after the thermal curing step, the photoactive material can be selectively photopolymerized by exposure to light causing a physical separation between regions of photopolymer and regions of cured polysiloxane binder results. There is an inhomogeneous region caused by the refractive index difference between the regions of photopolymer and the regions of cured polysiloxane binder in which the data may be stored. Thus, polymerization of at least a portion of the photoactive material provides an optically readable datum within the holographic storage medium. The information stored in the inhomogeneous region may be reconstructed by shining a single beam of light through the inhomogeneous region.

The thermally cured polysiloxane binder desirably has sufficient optical quality (e.g., low scatter, low birefringence, and negligible losses at the wavelengths of interest), to render the data in the holographic storage material readable. In addition, the cured polysiloxane binder desirably does not inhibit polymerization of the photoactive material. Furthermore, the cured polysiloxane binder desirably is capable of withstanding the processing parameters and subsequent storage conditions.

The thermally cured polysiloxane binder may have a glass transition temperature of about −130° C. to about 150° C., or higher. In addition, to provide a holographic medium that exhibits relatively low levels of light scatter, the cured polysiloxane binder and photoactive material, as well as any other components, are advantageously compatible. Polymers are considered to be compatible if a blend of the polymers is characterized, in a 90° light scattering experiment using a wavelength used for hologram formation, by a Rayleigh ratio (R 90°) less than about $7 \times 10^{-3}$ cm$^{-1}$. The Rayleigh ratio is a well-known property, and is defined as the energy scattered by a unit volume in the direction θ (per steradian), when a medium is illuminated with a unit intensity of unpolarized light. The Rayleigh ratio may be obtained by comparison to the energy scatter of a reference material having a known Rayleigh ratio. The compatibility of the binder material with other components, such as the photoactive material, may be increased by appending to the binder material groups that resemble such other components (e.g., a functional group from a photoactive material), or by appending to the binder material a group that displays a favorable enthalpic interaction, such as hydrogen bonding, with such other components. Modifications may be made to various components of a material to increase the overall compatibility of the individual components.

The thermally cured polysiloxane binder, which may include polysiloxane copolymers, may be formed from a thermally curable siloxane material comprising a monomer, oligomer, or a combination comprising one or more of the foregoing materials, wherein the monomers and/or oligomers include alkenyl and hydride functionalites as discussed above. The physical, optical, and chemical properties of the cured polysiloxane binder, for example, can all be tailored for optimum performance in the recording medium inclusive of, for example, dynamic range, recording sensitivity, image fidelity, level of light scattering, and data lifetime. Suitable polysiloxanes include, but are not intended to be limited to, poly (methyl methyl siloxanes); poly(methyl phenyl siloxanes), oligomers thereof, such as 1,3,5-trimethyl-1,1,3,5,5-pentaphenyltrisiloxane; and poly(acryloxypropyl)methyl siloxane, and combinations comprising at least one of the foregoing polysiloxanes. Other suitable siloxanes will be apparent to those skilled in the art in view of this disclosure. Commercially available monomers and/or oligomers having alkenyl and hydride functionalities can be obtained from Gelest, Inc.

The optional binder catalyst may be used to initiate or promote thermal cure of the thermally curable siloxane material. The binder catalyst can be a homogeneous catalyst such as, for example, a metal-complex compound in a carrier agent such as alcohols, xylenes, divinylsiloxanes, or cyclic vinylsiloxanes. Specific metal-complex compounds include, but are not limited to, platinum divinyltetramethyl disiloxane, platinum carbonyl cyclovinylmethyl siloxane, platinum cyclovinylmethyl siloxane, platinum octaldehyde, titanium di-n-butoxide (bis-2,4-pentanedionate), titanium di-isopropoxide (bis-2,4-pentanedionate), titanium diisopropoxide bis(ethylacetoacetate), titanium 2-ethylhexoxide tetraoctyltitanate, and the like. Another binder catalyst, which may be employed is chloroplatinic acid (also referred to as "Speier's catalyst"). Other catalysts include, but are not intended to be limited to, radical hydrosilylation catalysts, such as tributyltin hydride, benzoyl peroxide, and Lupersol 101, the tradename for 2,5,-bis(tert-butylperoxy)-2,5-dimethyl hexane available from Atofina Chemicals.

The photoactive material may comprise a monomer, an oligomer, or a combination comprising one of the foregoing materials, capable of undergoing photo-initiated polymerization to form a polymer that has a refractive index different from that of the binder. For example, cationically polymerizable systems such as, for example, vinyl ethers, alkenyl ethers, allene ethers, ketene acetals, and epoxides are suitable for use in the present disclosure. Other suitable photoactive materials include those which polymerize by a free-radical reaction such as, for example, molecules containing ethylenic unsaturation such as acrylates, methacrylates, methyl methacrylates, acrylamides, methacrylamides, styrene, substituted styrenes, vinyl naphthalene, substituted vinyl naphthalenes, and other vinyl derivatives. Free-radical copolymerizable pair systems are also suitable, e.g., vinyl ethers mixed with maleates, thiols mixed with olefins, and the like.

Suitable epoxide materials include, but are not intended to be limited to, cyclohexene oxide; cyclopentene oxide; 4-vinylcyclohexene oxide; derivatives such as silylethyl derivatives capable of being prepared from 4-vinylcyclohexene oxide; 4-alkoxymethylcyclohexene oxides; acyloxymethylcyclohexene oxides capable of being prepared from 4-hydroxymethylcyclohexenes; polyfunctional epoxides such as 3,4-epoxycyclohexylmethyl-3,4-epoxycyclohexanecarboxylate; 1,3-bis(2-(3,4-epoxycyclohexyl)ethyl)-1,1,3,3-tetramethydisiloxane; 2-epoxy-1,2,3,4-tetrahydronaphthalene; and combinations comprising one or more of the foregoing epoxide materials. A suitable commercially available epoxide is bis-epoxy monomer under the trade name PC-1000 from Polyset Inc.

Other suitable epoxide materials include those in which one or more cyclohexene oxide groupings are linked to an Si—O—Si grouping. Examples of such materials include those of the Formula (II):

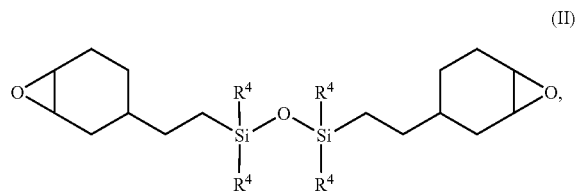

wherein each $R_4$ is independently an alkyl group containing less than or equal to about 6 carbon atoms.

A variety of tri-, tetra- and higher polyepoxysiloxanes may also be employed as the photoactive epoxide material. One group of such polyepoxysiloxanes are the cyclic compounds of Formula (III):

wherein each group $R^5$ is, independently, a monovalent substituted or unsubstituted $C_{1-12}$ alkyl, $C_{1-12}$ cycloalkyl, aralkyl or aryl group; each group $R^6$ is, independently, $R^5$ or a monovalent epoxy functional group having 2 to 10 carbon atoms, with the proviso that at least three of the groups $R^5$ are epoxy functional; and n is 3 to 10. A specific material of this type is 1,3,5,7-tetrakis(2-(3,4-epoxycyclohexyl)ethyl)-1,3,5,7-tetramethylcyclotetrasiloxane.

Other suitable photoactive epoxide materials are those of Formula (IV):

wherein $R^7$ is an $OSi(R^8)_2R^9$ grouping, or a monovalent substituted or unsubstituted $C_{1-12}$ alkyl, $C_{1-12}$ cycloalkyl, aralkyl or aryl group; each group $R^8$ is, independently, a monovalent substituted or unsubstituted $C_{1-12}$ alkyl, $C_{1-12}$ cycloalkyl, aralkyl or aryl group; and each group $R^9$ is, independently, a monovalent epoxy functional group having 2 to 10 carbon atoms. One specific material is that in which $R^7$ is a methyl group or an $OSi(R^8)_2R^9$ grouping; each group $R^8$ is a methyl group, and each group $R^9$ is a 2-(3,4-epoxycyclohexyl)ethyl grouping.

Another group of photoactive epoxide materials are those of Formula (V):

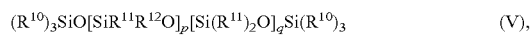

wherein each group $R^{10}$ is, independently, a monovalent substituted or unsubstituted $C_{1-12}$ alkyl, $C_{1-12}$ cycloalkyl, or phenyl group; each group $R^{11}$ is, independently, a monovalent substituted or unsubstituted $C_{1-12}$ alkyl, $C_{1-12}$ cycloalkyl, aralkyl or aryl group; each group $R^{12}$ is, independently, a monovalent epoxy functional group having 2 to 10 carbon atoms, and p and q are integers. Specific materials of this type are those in which each group $R^{10}$ and $R^{11}$ is an alkyl group, such as, for example, that in which $R^{12}$ is a 2-(3,4-epoxycyclohexyl)ethyl grouping and p and q are about equal.

Combinations comprising one or more of the foregoing photoactive materials may also be employed.

The holographic storage medium also comprises a photo-initiator for inducing polymerization of the photoactive material. Direct light-induced polymerization of the photoactive material by itself, such as by exposure to light may be difficult, particularly as the thickness of storage media increase. The photo-initiator, upon exposure to relatively low levels of the recording light, chemically initiates the polymerization of the photoactive material, avoiding the need for direct light-induced polymerization.

One type of photo-initiator is a photoacid generator that is capable, or contains a moiety that is capable, of absorbing incident radiation at some wavelength, and, through subsequent chemical transformation, releasing at least one proton, strong protic acid, or Lewis acid. Where a photoacid generator has a low absorbance at a preferred radiation, a sensitizer may optionally be used. Sensitizers absorb, or contain a moiety that absorbs, the incident radiation at the wavelength of interest, and transfer the energy to the photoacid generator (e.g., by way of Forster transfer, electron transfer, or chemical reaction) thereby inducing reaction of the photoacid generator. For example, many photoacid generators respond to UV light, whereas visible light (e.g., 400 to 700 nm) is typically used for recording holograms. Thus, sensitizers that absorb at such visible wavelengths and transfer energy to photo-initiators may be used. Rubrene and 5,12-bis(phenylethynyl) napthacene, are such sensitizers that absorb at visible wavelengths.

In one embodiment, the photoacid generator may have a sensitizer moiety, or the released proton or acid may originate with the sensitizer. For example, the photoacid generator and sensitizer may be covalently bonded. Such a covalently bound photoacid generator/sensitizer, however, would be extremely sensitive to the radiation absorbed by the sensitizer. In other embodiments, the photoacid generator and/or sensitizer may be bound to the binder and/or the photoactive material. Examples of suitable photoacid generators include, but are not intended to be limited to, cationic photo-initiators such as diazonium, sulfonium, phosphonium and iodonium salts. In particular, alkoxyphenyl phenyliodonium salts, such as p-octyloxyphenyl phenyliodonium hexafluoroantimonate, ditolyliodonium tetrakis (pentafluorophenyl) borate, diphenyliodonium tetrakis (pentafluorophenyl) borate, tolylphenyliodonium tetrakis (pentafluorophenyl) borate, cumyltolyliodonium tetrakis (pentafluorophenyl) borate, and combinations comprising one or more of the foregoing photo-initiators may be desirable. These salts absorb predominantly in the UV portion of the spectrum, and are therefore generally sensitized to allow use of the visible portion of the spectrum. An example of a visible cationic photo-initiator is (η6-2,4-cyclopentadien-1-yl) (η6-isopropylbenzene)-iron(II) hexafluorophosphate, available commercially from Ciba as Irgacure 261, which may be employed alone or in combination with any of the foregoing photo-initiators. Another suitable photo-initiator is bis(eta-5-2,4-cyclopentadien-1-yl)bis[-2,6-difluoro-3-1H-pyrrol-1-ylphenyl]titanium available as Irgacure 784 available from Ciba.

In the absence of a sensitizer, iodonium salts are typically sensitive to radiation in the far UV, below about 300 nm, and the use of far UV radiation is inconvenient for the production of holograms because, for a given level of performance, UV lasers are substantially more expensive than visible lasers. However, it is well known that, by the addition of various sensitizers, iodonium salts can be made sensitive to various wavelengths of radiation to which the salts are not substantially sensitive in the absence of the sensitizer. In particular, iodonium salts can be sensitized to visible radiation with sensitizers using certain aromatic hydrocarbons, a specific sensitizer of this type being 5,12-bis(phenylethynyl) naphthacene. This sensitizer renders iodonium salts sensitive to 514 nm radiation from an argon ion laser, and to 532 nm radiation from a frequency-doubled YAG laser, both of which are suitable sources for the production of holograms.

Where the photoactive monomer is not polymerized by acid catalysis, a variety of other types of photo-initiators known to those skilled in the art and available commercially are suitable for polymerization. To avoid the need for sensitizers, a photo-initiator can be employed that is sensitive to light in the visible part of the spectrum, particularly at wavelengths available from commercially available laser sources, e.g., the blue and green lines of $Ar^+$ (458, 488, 514 nm), He—Cd lasers (442 nm), the green line of frequency doubled YAG lasers (532 nm), the red lines of He—Ne (633 nm), and Kr+ lasers (647 and 676 nm). For example, bis(η-5-2,4-cyclopentadien-1-yl)bis[2,6-difluoro-3-(1H-pyrrol-1-yl)phenyl]titanium, available commercially from Ciba as CGI-784, can be used. Another visible free-radical photo-initiator (which requires a co-initiator) is 5,7,diiodo-3-butoxy-6-fluorone, commercially available from Spectra Group Limited as H-Nu 470.

The proportions of photo-initiator, polysiloxane binder, photoactive material, and optional binder catalyst and/or sensitizer in the holographic storage medium may vary rather widely, and the optimum proportions for specific components and methods of use can readily be determined empirically by those skilled in the art without undue experimentation. However, in general, the holographic storage medium comprises about 1 to about 10 percent by weight of the photo-initiator, about 10 to about 89 percent by weight of the polysiloxane binder, and about 10 to about 89 percent by weight of the photoactive material, wherein the weight percents are based on the total medium composition. Optionally, the holographic storage medium may further comprise about 0.01 to about 2 percent by weight of the binder catalyst and about 0.1 to about 10 percent by weight of the sensitizer.

The holographic storage medium may be formed by adequately supporting the mixture (i.e., the thermally curable siloxane binder material, photoactive material, photo-initiator, and optionally the binder catalyst and/or sensitizer), such that holographic writing and reading may occur. Fabrication of the storage medium may involve depositing the mixture between two plates using, for example, a gasket to contain the mixture. The plates may be glass, but other materials transparent to the radiation used to write data, e.g., a plastic such as polycarbonate or poly(methyl methacrylate) may be used. Spacers may be placed between the plates to maintain a desired thickness for the holographic storage medium. The holographic storage medium also may be supported in other ways. For example, the mixture may be disposed in the pores of a support, e.g., a nano-porous glass material such as Vycor, prior to binder cure. A stratified medium, i.e., a medium containing multiple supports, e.g., glass, with layers of storage material disposed between the supports may also be used.

The binder cure step comprises heating the mixture, and any support, to thermally cure the binder material. The binder thermal cure step may occur at a temperature of about 25° C. to about 100° C. After the binder cure step, the holographic storage medium may be subjected to processes known to those skilled in the art for holographic data storage, i.e., portions of the photoactive material are exposed to a suitable light source. Holographic data storage is one of several techniques that may use the full volume of a storage material to maximize data density (as opposed to surface storage as is used in CD and DVD type systems). In the holographic storage process, the data is used to generate an optical interference pattern, which is subsequently stored in the holographic storage medium.

An example of a suitable holographic data storage process to create holographic storage media of the present disclosure is set forth in FIG. 1a. In this configuration, the output from a laser 10 is divided into two equal beams by beam splitter 20. One beam, the signal beam 40, is incident on a form of spatial light modulator (SLM) or deformable mirror device (DMD) 30, which imposes the data to be stored in signal beam 40. This device is composed of a number of pixels that can block or transmit the light based upon input electrical signals. Each pixel can represent a bit or a part of a bit (a single bit may consume more than one pixel of the SLM or DMD 30) of data to be stored. The output of SLM or DMD 30 is then incident on the storage medium 60. The second beam, the reference beam 50, is transmitted all the way to storage medium 60 by reflection off first mirror 70 with minimal distortion. The two beams are coincident on the same area of storage medium 60 at different angles. The net result is that the two beams create an interference pattern at their intersection in the storage medium 60. The interference pattern is a unique function of the data imparted to signal beam 40 by SLM or DMD 30. At least a portion of the photoactive monomer undergoes polymerization, which leads to a modification of the refractive index in the region exposed to the laser light and fixes the interference pattern, effectively creating a grating in the storage medium 60.

For reading the data, as depicted in FIG. 1b, the grating or pattern created in storage medium 60 is simply exposed to reference beam 50 in the absence of signal beam 40 by blocking signal beam 40 with a shutter 80 and the data is reconstructed in a recreated signal beam 90.

Figure 2:
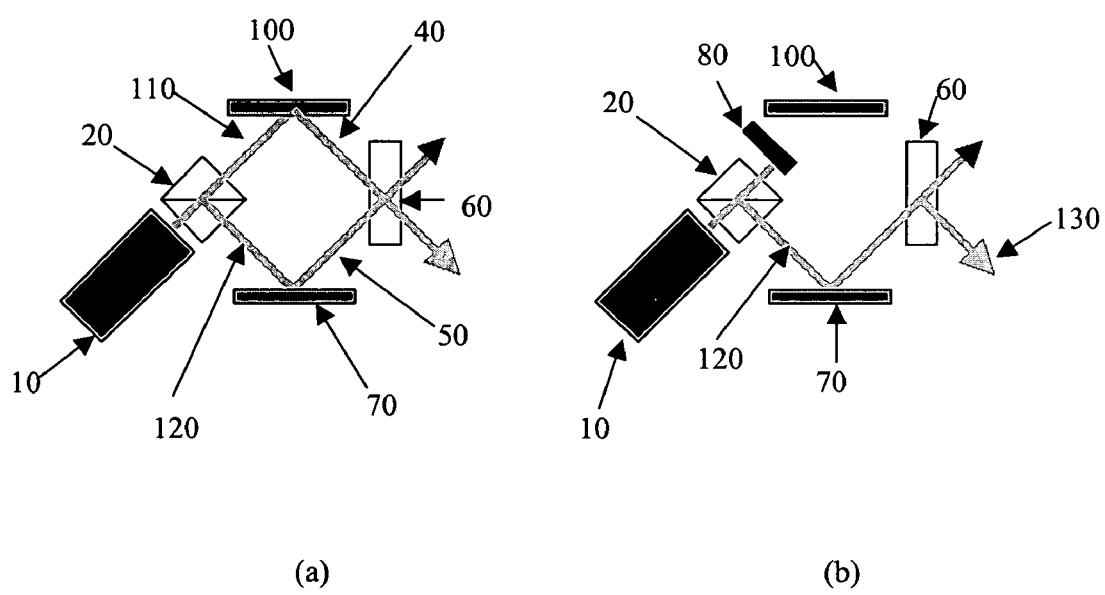
FIG. 2 is a schematic representation of a diffraction efficiency characterization setup for (a) writing plane wave holograms and (b) measuring diffracted light.

In order to test the characteristics of the material, a diffraction efficiency measurement can be used. A suitable system for these measurements is shown in FIG. 2a. This setup is very similar to the holographic storage setup; however, there is no SLM or DMD, but instead, a second mirror 100. The laser 10 is split into two beams 110 and 120 that are then interfered in storage medium 60 creating a plane wave grating. As depicted in FIG. 2b, one of the beams is then turned off or blocked with shutter 80 and the amount of light diffracted by the grating in storage medium 60 is measured. The diffraction efficiency is measured as the power in diffracted beam 130 versus the amount of total power incident on storage medium 60. More accurate measurements may also take into account losses in storage medium 60 resulting from reflections at its surfaces and/or absorption within its volume.

Figure 3:
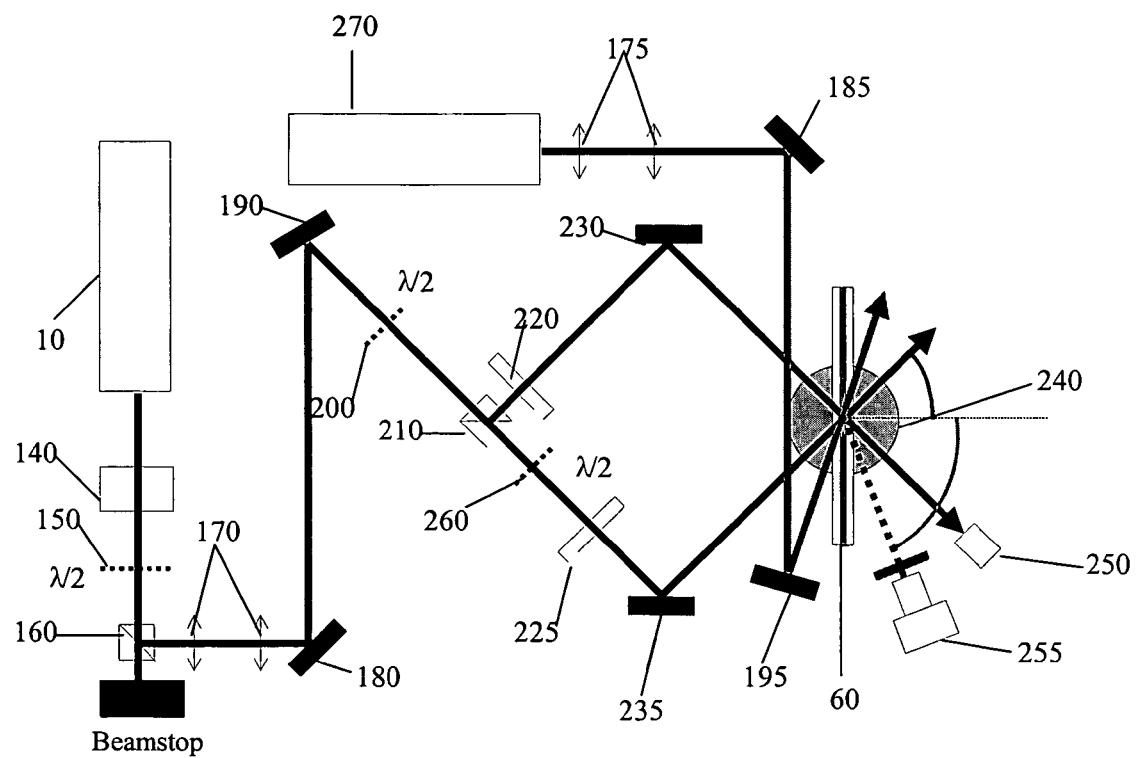
FIG. 3 is a schematic representation of a holographic plane-wave characterization system.

Alternatively, a holographic plane-wave characterization system may be used to test the characteristics of the medium, especially multiplexed holograms. Such a system can provide the M/# for a given sample, which is the metric used to characterize the ultimate dynamic range or information storage capacity of the sample as measured by the maximum number and efficiency of multiplexed holograms stored in the medium. A suitable system for these measurements is shown in FIG. 3. In this setup the output from first laser 10 is passed through a first shutter 140 for read/write control, a combination of a first half-wave plate 150, and a first polarizing beam splitter 160 for power control. The light is then passed through a first two-lens telescope 170 to adjust the beam size and reflected off first mirror 180 followed by second mirror 190 to transport the beam into the measurement area. The light is then passed through a second half-wave plate 200 and a second polarizing beam splitter 210 to split the beam in two and to control the power in each of the two beams. The beam reflected off of beam splitter 210 is then passed through a second shutter 220, which enables independent on/off control of the power in the first beam. The first beam is then reflected off of a third mirror 230 and is incident on medium 60, which is mounted on a rotation stage 240. The light from the first beam transmitted through medium 60 is collected into a first detector 250. The second beam is passed through a third half-wave plate 260 to rotate its polarization into the same direction as the first beam and then through a third shutter 225 to provide on/off control of the second beam. The second beam is then reflected off of fourth mirror 235 and is incident on medium 60. For measuring the in-situ dynamic change in the sample during exposure, a second laser 270 is passed through a second two-lens telescope 175, reflected off of fifth mirror 185 and then sixth mirror 195, and is then coincident on medium 60 at the same location as the first and second beams. The diffracted beam is then collected into second detector 255.

The holographic storage medium may be utilized in conjunction with a process whereby light of one wavelength from a laser is utilized to write the data into the holographic storage medium, while light of the same or a different wavelength is utilized to read the data. For the holographic storage media of the present disclosure, a refractive index change is created by using a writing laser wavelength that induces selective photopolymerization of the photoactive material. Thus, the wavelength employed for writing the data is a function of the specific photoactive material used.

Once all data has been written onto the holographic storage medium, a larger, broad area of the storage medium may be exposed to a wavelength of light suitable to react with the remaining unreacted photo-initiator and then polymerize any remaining unpolymerized photoactive material. The broad area may be larger than the size of stored holograms to the size of the entire storage medium. This photocuring step can minimize movement of the components of the storage medium. The method may thus further comprise exposing at least a portion of the storage medium having an area larger than the hologram to a wavelength of light sufficient to react any unreacted photo-initiator and to polymerize any unpolymerized photoactive material.

As one skilled in the art will appreciate, different molecules will have widely differing absorption profiles (broader, narrower, etc.). Thus, the wavelengths utilized for writing and reading the holographic storage media of the present disclosure will depend upon the light source, the photo-initiator, and the specific photoactive material. Wavelengths suitable for writing data into the holographic storage media may vary, and can be about 375 nm to about 830 nm. In another embodiment, the wavelength for writing data is about 400 nm to about 550 nm. The reading wavelength may be the same as, or different from, the writing wavelength. In one embodiment, the reading and writing wavelengths are the same.

In some embodiments, the reading wavelength and the writing wavelength may be about 375 nm to about 830 nm. In other embodiments, the wavelength of light used for writing can be about 400 nm to about 550 nm, and the reading wavelength can be about 600 nm to about 700 nm. In yet another embodiment, a wavelength of 532 nm light can be used for writing and wavelengths of either 633 nm or 650 nm light can be used for reading. Alternatively, read and write wavelengths may be 532 nm and 405 nm, respectively.

The present disclosure is illustrated by the following non-limiting example.

EXAMPLE 1

Microscope slides (Corning), 50 mm×75 mm×1 mm, were used as the support. Plastic spacers, which were used to maintain and control media thickness, were cut from 0.26 mm nylon shimstock (McMaster-Carr).

A stock solution of sensitizer was prepared by adding 10 milligrams (mg) rubrene (5,12-bis(phenylethynyl) naphthacene) to 10 milliliters (mL) of PC-1000. After mixing, the solution was stored in the dark for 24 hours and filtered through glass wool. The filtered stock solution was stored in the dark in a foil wrapped vial until needed.

A platinum catalyst solution was prepared prior to media preparation, by adding 1 drop platinum 1,3-divinyltetramethyl disiloxane (in xylenes) to 4 mL of poly-methylphenylsiloxane.

A mixture containing 2 mL stock sensitizer solution, 0.5 mL poly-methylphenyl siloxane, 0.5 mL platinum catalyst solution, 4 drops dimethylhydrosiloxane:methylphenylsiloxane copolymer, and 2 drops UV-9380C photo-acid generator (General Electric Silicones) was mechanically mixed for 20 minutes in a foil wrapped glass vial. Approximately 0.25 mL of this mixture was sandwiched between the microscope slides using the plastic spacers to maintain thickness. The media samples were thermally cured on a hotplate at approximately 70° C. for 2 minutes per side. During thermal curing, the samples were covered with a sheet of foil to prevent exposure to light.

A maximum diffraction efficiency measured with a holographic test bed as shown and described in relation to FIGS. 2a and 2b. The maximum diffraction efficiency was 39%.

Holographic data storage media comprising a thermally cured polysiloxane binder, a photoactive epoxide monomer, a photo-initiator, a sensitizer, and a binder catalyst has been described. An advantage of this system is that by employing two separate chemical processes, the photoactive material is preserved for data storage instead of being consumed during binder cure, which is easily controlled by employing heat rather than light, resulting in consistent levels of polymerization between media samples.

As used herein, the terms "first," "second," and the like do not denote any order or importance, but rather are used to distinguish one element from another, and the terms "the", "a" and "an" do not denote a limitation of quantity, but rather denote the presence of at least one of the referenced item. Furthermore, all ranges reciting the same physical property are inclusive of the recited endpoints and independently combinable.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A hologaphic storage medium comprising:
   a thermally crosslinked polysiloxane binder;
   a photoactive material; and
   a photo-initiator, wherein the photoactive material has a concentration that remains about the same before and after a thermal cure process to form the thermally crosslinked polysiloxane binder, and
   wherein the thermally crosslinked polysiloxane binder is formed from a completely linear monomer, oligomer, or combination of monomer and oligomer that consists of at least one of a poly (methyl methyl siloxane); a poly (methyl phenyl siloxane); or poly (acryloxypropyl) methyl siloxane, wherein the photoactive material comprises an epoxide comprising cyclohexene oxide; cyclopentene oxide; 4-vinylcyclohexene oxide; 4-alkoxymethylcyclohexene oxides; acyloxymethylcyclohexene oxides; 3,4-epoxycyclobexylmethyl-3,4-epoxycyclohexanecarboxylate; 1,3-bis(2-(3,4-epoxycyclohexyl)ethyl)-1,1,3,3-tetramethydisiloxanc; 2-epoxy-1,2,3,4-tetrahydronaphthalene; derivatives capable of being prepared from the foregoing epoxides; or combinations comprising one of the foregoing epoxides.

2. A holographic storage medium comprising:
   a thermally crosslinked polysiloxane binder;
   a photoactive material; and
   a photo-initiator, wherein the photoactive material has a concentration that remains about the same before and after a thermal cure process to form the thermally crosslinked polysiloxane binder, and
   wherein the thermally crosslinked polysiloxanc binder is formed from a completely linear monomer, oligomer, or combination of monomer and oligomer that consists of at least one of a poly (methyl methyl siloxane); a poly (methyl phenyl siloxane); or poly (acryloxpropyl) methyl siloxane, wherein the photoactive material comprises an epoxide compound represented by:

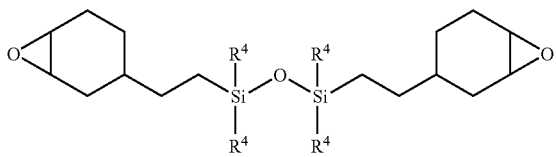

wherein each R4 is independently an alkyl group containing less than or equal to about 6 carbon atoms.

3. A holographic storage medium comprising:
a thermally crosslinked polysiloxane binder;
a photoactive material; and
a photo-initiator, wherein the photoactive material has a concentration that remains about the same before and after a thermal cure process to form the thermally crosslinked polysiloxane binder, wherein the photoactive material comprises a cyclic epoxide compound represented by:

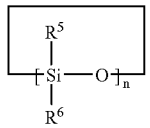

wherein each group R5 is, independently, a monovalent substituted or unsubstituted C1–12 alkyl, C1–12 cycloalkyl, aralkyl or aryl group; each group R6 is, independently, R5 or a monovalent epoxy functional group having 2 to 10 carbon atoms, with the proviso that at least three of the groups R6 are epoxy functional; and n is 3 to 10.

4. A holographic storage medium comprising:
a thermally crosslinked polysiloxane binder;
a photoactive material; and
a photo-initiator, wherein the photoactive material has a concentration that remains about the same before and after a thermal cure process to form the thermally crosslinked polysiloxane binder, wherein the photoactive material comprises a compound represented by:

(R$^{10}$)$_3$SiO[SiR$^{11}$R$^{12}$O]p[Si(R$^{11}$)$_2$O]qSi(R$^{10}$)$_3$ wherein each group R10 is, independently, a monovalent substituted or unsubstituted C1–12 alkyl, C1–12 cycloalkyl, or phenyl group; each group R11 is, independently, a monovalent substituted or unsubstituted C1–12 alkyl, C1–12 cycloalkyl, aralkyl or aryl group; each group R12 is, independently, a monovalent epoxy functional group having 2 to 10 carbon atoms, and p and q are integers.

5. A holographic storage medium comprising:
a thermally crosslinked polysiloxane binder;
a photoactive material; and
a photo-initiator, wherein the photoactive material has a concentration that remains about the same before and after a thermal cure process to form the thermally crosslinked polysiloxane binder, and wherein the thermally crosslinked polysiloxane binder is formed from a completely linear monomer, oligomer, or combination of monomer and oligomer that consists of at least one of a poly (methyl methyl siloxane); a poly (methyl phenyl siloxane); or poly (acryloxypropyl) methyl siloxane, wherein the photo-initiator comprises p-oetyloxyphenyl phenyliodonium hexafluoroantimonate, ditolyliodonium tetrakis (pentafluorophenyl) borate, diphenyliodonium tetrakis (pentafluorophenyl)borate, tetrakis(pentafluorophenyl) borate, cumyltolyliodonium tetrakis(pentafluorophenyl) borate, η 6-2,4-cyclopentadien-1-yl) (η 6- isopropylbenzene )-iron(II) hexafluorophosphate, bis(η-5-2, 4- cyclopentadien-1-yl) bis(2,6-difluoro-3-(1H-pyrrol-1-yl)phenyl)titanium, 5,7,diido-3-butoxy-6- fluorone, or a combination comprising at least one of the foregoing photoinitiators.

6. The holographic storage medium of claim 5, further comprising a sensitizer for the photo-initiator.

7. A method for producing a holographic storage medium, comprising:
forming a mixture comprising a thermally polymerizable siloxane binder material, a photoactive material, and a photo-initiator;
heating the mixture effective to cure the thermally polymerizable siloxane binder material, wherein the photoactive material has a concentration that remains about the same before and after heating the mixture; and
writing data into the medium with an information-carrying light pattern at a wavelength effective to activate the photo-initiator and to polymerize at least a portion of the photoactive material, wherein the thermally polymerizable polysiloxane binder comprises one or more cross linked or polymerized silicone monomers and/or oligomers, wherein the one or more cross linked or polyrnerized silicone monomers and/or oligomers, prior to cross linking and/or polymerization, contain an alkenyl reactive functional group and a hydride reactive functional group.

8. The method of claim 7, wherein the one or more silicone monomers and/or oligomers containing the alkenyl functional group comprises a formula of:

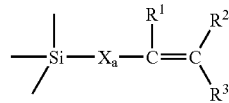

wherein R1, R2, and R3 each independently comprise hydrogen or a monovalent hydrocarbon radical, X a divalent hydrocarbon radical, and a is a whole number having a value between 0 and 8, inclusive.

9. A method for storing data in a holographic storage medium comprising:
forming a holographic storage medium comprising a thermally cured polysiloxane binder, a photoactive material, and a photo-initiator, wherein the thermally cured palysiloxane binder comprises one or more cross linked or polymerized silicone monomers and/or oligomers, wherein the one or more cross linked or polymerized silicone monomers and/or oligomers, prior to cross linking and/or polymerization, contain an alkenyl reactive functional group and a hydride reactive functional group, and wherein the photoactive material has a concentration that remains about the same before and after a thermal cure process to form the thermally crosslinked palysiloxane binder; and illuminating the holographic storage medium with both a signal beam containing data and a reference beam, thereby forming within the holographic storage medium an interference pattern, wherein the photo-initiator initiates polymerization of at least a portion of the photoactive material in response to the signal beam and reference beam, wherein the thermally polymerizable polysiloxane binder comprises one or more cross linked or polymerized silicone monomers and/or oligomers, wherein the one or more cross linked or polyrnerized silicone monomers and/or oligomers, prior to cross linking and/or polymerization, contain an alkenyl reactive functional group and a hydride reactive functional group.

10. A method for storing data in a holographic storage medium comprising:

forming a holographic storage medium comprising a thermally cured polysiloxane binder, a photoactive material, and a photo-initiator, wherein the thermally cured polysiloxane binder comprises one or more cross linked or polymerized silicone monomers and/or oligomers, wherein the one or more cross linked or polymerized silicone monomers and/or oligomers, prior to cross linking and/or polymerization, contain an alkenyl reactive functional group and a hydride reactive functional group, and wherein the photoactive material has a concentration that remains about the same before and after a thermal cure process to form the thermally crosslinked polysiloxane binder; and illuminating the holographic storage medium with both a signal beam containing data and a reference beam, thereby forming within the holographic storage medium an interference pattern, wherein the photo-initiator initiates polymerization of at least a portion of the photoactive material in response to the signal beam and reference beam, wherein the one or more silicone monomers and/or oligomers containing the alkenyl functional group comprises a formula of:

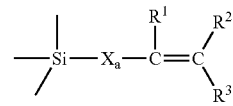

wherein R1, R2, and R3 each independently comprise hydrogen or a monovalent hydrocarbon radical, X a divalent hydrocarbon radical, and a is a whole number having a value between 0 and 8, inclusive.

11. The method of claim 10, wherein the signal beam has a wavelength of about 375 nm to about 830 nm.

* * * * *